(12) United States Patent
Liu et al.

(10) Patent No.: US 10,673,069 B2
(45) Date of Patent: Jun. 2, 2020

(54) HYBRID ANODES FOR ENERGY STORAGE DEVICES

(75) Inventors: Jun Liu, Richland, WA (US); Jie Xiao, Richland, WA (US); Cheng Huang, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 1045 days.

(21) Appl. No.: 13/532,206

(22) Filed: Jun. 25, 2012

(65) Prior Publication Data

US 2013/0344354 A1     Dec. 26, 2013

(51) Int. Cl.
| | | |
|---|---|---|
| *H01M 4/38* | (2006.01) | |
| *H01M 4/587* | (2010.01) | |
| *H01M 4/485* | (2010.01) | |
| *H01M 4/58* | (2010.01) | |
| *H01M 10/0525* | (2010.01) | |
| *H01M 4/40* | (2006.01) | |
| *H01M 4/13* | (2010.01) | |

(52) U.S. Cl.
CPC .............. *H01M 4/38* (2013.01); *H01M 4/13* (2013.01); *H01M 4/405* (2013.01); *H01M 4/485* (2013.01); *H01M 4/587* (2013.01); *H01M 4/5815* (2013.01); *H01M 10/0525* (2013.01); *Y02T 10/7011* (2013.01)

(58) Field of Classification Search
CPC ........... H01M 10/0525; H01M 10/052; H01M 4/485; H01M 4/366; H01M 4/667; H01M 4/38
See application file for complete search history.

(56) References Cited

U.S. PATENT DOCUMENTS

| | | | | |
|---|---|---|---|---|
| 4,419,424 A | * | 12/1983 | Julian | ...................... H01M 4/02 429/217 |
| 4,615,959 A | | 10/1986 | Hayashi et al. | |
| 5,744,258 A | * | 4/1998 | Bai et al. | ........................... 429/3 |
| 2009/0075161 A1 | * | 3/2009 | Ando | ...................... H01M 4/13 429/94 |
| 2012/0141876 A1 | | 6/2012 | Ryu et al. | |
| 2013/0171502 A1 | * | 7/2013 | Chen | ...................... H01G 11/06 429/149 |

FOREIGN PATENT DOCUMENTS

| | | |
|---|---|---|
| JP | 06-052891 A | 2/1994 |
| JP | 2709303 B2 | 2/1998 |

(Continued)

OTHER PUBLICATIONS

Cation mixing ($Li_{0.5}Fe_{0.5}$)$_2SO_4F$ cathode material for lithium-ion batteries, Sun Yang ( 孙洋 ) et al 2011 Chinese Phys. B 20 126101.*

(Continued)

*Primary Examiner* — Jimmy Vo
(74) *Attorney, Agent, or Firm* — Klarquist Sparkman, LLP

(57) ABSTRACT

Energy storage devices having hybrid anodes can address at least the problems of active material consumption and anode passivation that can be characteristic of traditional batteries. The energy storage devices each have a cathode separated from the hybrid anode by a separator. The hybrid anode includes a carbon electrode connected to a metal electrode, thereby resulting in an equipotential between the carbon and metal electrodes.

12 Claims, 12 Drawing Sheets

(56) References Cited

FOREIGN PATENT DOCUMENTS

| | | |
|---|---|---|
| JP | 10-112307 A | 4/1998 |
| JP | 2011-086554 A | 4/2011 |
| KR | 20-0265012 Y1 | 2/2002 |

OTHER PUBLICATIONS

International Search Report/Written Opinion for International Application No. PCT/US2013/020620, International filing date Jan. 8, 2013, dated Apr. 29, 2013.
Sun, Hao, et al., "Hard carbon/lithium composite anode materials for Li-ion batteries," Electrochimica Acta, 2007, pp. 4312-4316, vol. 52, Elsevier, Beijing, China.
Imanishi, N., et al., "Carbon-lithium anodes for lithium secondary batteries," Journal of Power Sources, 1992, pp. 185-191, vol. 39, Elsevier Sequoia, Tsu, Japan.

* cited by examiner

HYBRID ANODES FOR ENERGY STORAGE DEVICES

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

Practical implementation of a number of important technologies has been slowed by limitations in state-of-the-art energy storage devices. For example, current lithium ion batteries exhibit insufficient capacities to enable the extended driving range demanded by the electric vehicle market. Various types of energy storage devices show promise, including those having electrodes comprising Li, Na, Zn, Si, Mg, Al, Sn, and Fe. In another example, lithium sulfur batteries are attractive because of the large specific capacity and energy density. However, some obstacles must be overcome before any of these devices can successfully be implemented. In lithium sulfur batteries, the formation of soluble long chain polysulfides during charge/discharge can lead to the gradual loss of active mass from the cathode into the electrolyte and onto the lithium anode, continuously forming a passivation film. As a result, severe self-discharge and capacity decay upon cycling are usually observed, hindering the practical application of lithium sulfur batteries. Similarly, in lithium-ion batteries, metal plating on the anode, particularly at high charge rates, can lead to cell shorting and combustion—thus presenting a major safety concern. Improved energy storage devices with stable electrochemical performance and improved safety are needed to enable the devices requiring electrical power.

SUMMARY

This document describes methods of operating energy storage devices as well as energy storage devices having hybrid anodes that address at least the problems of active material consumption and anode passivation. The energy storage devices each comprise a cathode separated from the hybrid anode by a separator. The hybrid anode comprises a carbon electrode connected to a metal electrode, thereby resulting in an equipotential between the carbon and metal electrodes. As used herein, equipotential can encompass minor deviations from a theoretical equipotential (i.e., a pseudo-equipotential). For example, the carbon electrode and metal electrode should, in principle, have the same potential. However, in some instances, it can take significant time to reach equilibrium and equal potentials. Thus, the potentials of the carbon and metal electrodes may be very close, but may not be quite equal.

In one sense, the carbon and metal electrodes are connected in parallel to function as an anode. The carbon and metal electrodes can be separated by a separator or can be exposed directly one to another. Furthermore, the carbon and metal electrodes can be in direct contact or can be separated by some amount of space. In particular embodiments, the carbon and metal electrodes remain in contact during operation and not merely prior to initial cycling. For example, the metal electrode is not merely an initial source of metal to be incorporated into the carbon electrode (i.e., intercalated, deposited, etc.). According to one embodiment, the carbon electrode functions as a drain for metal ions and helps to decouple the contamination problem, or undesired reactions, on the metal anode throughout operation of the device.

The carbon electrode can comprise graphite, hard carbon, carbon black, carbon fibers, graphene, and other conductive carbonaceous materials. The metal electrode can comprise Li, Na, Zn, Si, Mg, Al, Sn, and Fe. Preferably, the metal electrode comprises Li.

In some embodiments, the carbon electrode further comprises metalated carbon. For example, the carbon electrode can comprise lithiated carbon. Alternatively, or in addition, the carbon electrode can further comprise metal ions intercalated therein, deposited thereon, or both. In one embodiment, the metal ions comprise lithium ions.

Preferably, the carbon electrode is maintained in a metalated carbon state. Traditional energy storage devices are typically metalated during a charge process and demetalated during a discharge process. However, according to the present embodiment, loss of metalated carbon from the carbon electrode is compensated by the metal electrode of the hybrid anode. Accordingly, the carbon electrode can be viewed as a sink to drain metal ions from the metal electrode. Furthermore, in some instances, metal ions can return to the metal anode instead of to the carbon electrode as metalated carbon when charging.

In one embodiment, the cathode comprises sulfur and/or sulfur compounds. For instance, the sulfur compound can comprise polysulfides. In one example, polysulfides can comprise $Li_xS_y$, wherein x is from 0 to 4, and y is from 1 to 8. Devices having cathodes comprising sulfur and/or sulfur compounds, according to embodiments described herein, can be configured to exhibit a reversible capacity greater than, or equal to, 800 mAh $g^{-1}$ at 0.8 C during operation. Other embodiments can exhibit a capacity greater than, or equal to, 750 mAh $g^{-1}$ for more than 200 cycles.

In another embodiment, the cathode can comprise a lithium intercalation material, or a material capable of lithium intercalation. Examples can include, but are not limited to, $Li_{4-x}M_xTi_5O_{12}$ (M=Mg, Al, Ba, Sr, or Ta; $0 \leq x \leq 1$), $MnO_2$, $V_2O_5$, $V_6O_{13}$, $LiV_3O_8$, $LiM^{C1}_xM^{C2}_{1-x}PO_4$ ($M^{C1}$ or $M^{C2}$=Fe, Mn, Ni, Co, Cr, or Ti; $0 \leq x \leq 1$), $Li_3V_{2-x}M_x(PO_4)_3$ (M=Cr, Co, Fe, Mg, Y, Ti, Nb, or Ce; $0 \leq x \leq 1$), $LiVPO_4F$, $LiM^{C1}_xM^{C2}_{1-x}O_2$ (($M^{C1}$ or $M^{C2}$=Fe, Mn, Ni, Co, Cr, Ti, Mg, Al; $0 \leq x \leq 1$), $LiM^{C1}_xM^{C2}_yM^{C3}_{1-x-y}O_2$ (($M^{C1}$, $M^{C2}$, $M^{C3}$=Fe, Mn, Ni, Co, Cr, Ti, Mg, or Al; $0 \leq x \leq 1$; $0 \leq y \leq 1$), $LiMn_{2-y}X_yO_4$ (X=Cr, Al, or Fe, $0 \leq y \leq 1$), $LiNi_{0.5-y}X_yMn_{1.5}O_4$ (X=Fe, Cr, Zn, Al, Mg, Ga, V, or Cu; $0 \leq y < 0.5$), $xLi_2MnO_3 \cdot (1-x)LiM^{C1}_yM^{C2}_zM^{C3}_{1-y-z}O_2$ ($M^{C1}$, $M^{C2}$, or $M^{C3}$=Mn, Ni, Co, Cr, Fe, or mixture of; x=0.3-0.5; $y \leq 0.5$; $z \leq 0.5$), $Li_2MSiO_4$ (M=Mn, Fe, or Co), $Li_2MSO_4$ (M=Mn, Fe, or Co), $LiMSO_4F$ (Fe, Mn, or Co), $Li_{2-x}(Fe_{1-y}Mn_y)P_2O_7$ ($0 \leq y \leq 1$), $Cr_3O_8$, $Cr_2O_5$ and combinations thereof.

One embodiment of the present invention includes a lithium-sulfur energy storage device having a cathode comprising sulfur, sulfur compounds, or both, that is separated from a hybrid anode by a separator. The hybrid anode comprises a carbon electrode connected to a lithium metal electrode, thereby resulting in an equipotential between the carbon and lithium metal electrodes. The hybrid anode is further configured to comprise lithiated carbon at the carbon electrode during operation of the energy storage device. One example of lithiated carbon, includes, but is not limited to, $LiC_6$. The sulfur compound can comprise $Li_xS_y$, wherein x is from 0 to 4, and y is from 1 to 8. Preferably, the carbon electrode comprises graphite.

Another embodiment includes a lithium-ion energy storage device having a cathode comprising a lithium intercalation material that is separated from a hybrid anode by a separator. The hybrid anode comprises a carbon electrode connected to a lithium metal electrode, thereby resulting in an equipotential between the carbon and lithium metal electrodes. Furthermore, the hybrid anode further comprises lithiated carbon at the carbon electrode. Examples of materials for the carbon electrode can include, but are not limited to, graphite, hard carbon, carbon black, carbon fibers, graphene, and combinations thereof. The lithiated carbon can, for example, comprise $LiC_6$. Examples of a lithium intercalation material can include, but are not limited to, $Li_{4-x}M_xTi_5O_{12}$ (M=Mg, Al, Ba, Sr, or Ta; 0≤x≤1), $MnO_2$, $V_2O_5$, $V_6O_{13}$, $LiV_3O_8$, $LiM^{C1}_xM^{C2}_{1-x}PO_4$ ($M^{C1}$ or $M^{C2}$=Fe, Mn, Ni, Co, Cr, or Ti; 0≤x≤1), $Li_3V_{2-x}M_x(PO_4)_3$ (M=Cr, Co, Fe, Mg, Y, Ti, Nb, or Ce; 0≤x≤1), $LiVPO_4F$, $LiM^{C1}_xM^{C2}_{1-x}O_2$ (($M^{C1}$ or $M^{C2}$=Fe, Mn, Ni, Co, Cr, Ti, Mg, Al; 0≤x≤1), $LiM^{C1}_xM^{C2}_yM^{C3}_{1-x-y}O_2$ (($M^{C1}$, $M^{C2}$, $M^{C3}$=Fe, Mn, Ni, Co, Cr, Ti, Mg, or Al; 0≤x≤1; 0≤y≤1), $LiMn_{2-y}X_yO_4$ (X=Cr, Al, or Fe, 0≤y≤1), $LiNi_{0.5-y}X_yMn_{1.5}O_4$ (X=Fe, Cr, Zn, Al, Mg, Ga, V, or Cu; 0≤y<0.5), $xLi_2MnO_3 \cdot (1-x)LiM^{C1}_yM^{C2}_zM^{C3}_{1-y-z}O_2$ ($M^{C1}$, $M^{C2}$, or $M^{C3}$=Mn, Ni, Co, Cr, Fe, or mixture of; x=0.3-0.5; y≤0.5; z≤0.5), $Li_2MSiO_4$ (M=Mn, Fe, or Co), $Li_2MSO_4$ (M=Mn, Fe, or Co), $LiMSO_4F$ (Fe, Mn, or Co), $Li_{2-x}(Fe_{1-y}Mn_y)P_2O_7$ (0≤y≤1), $Cr_3O_8$, $Cr_2O_5$, and combinations thereof.

This document also describes methods of operating an energy storage device having a cathode separated by a separator from a hybrid anode. The methods are characterized by electrically connecting a carbon electrode and a metal electrode, thereby resulting in an equipotential between the carbon and metal electrodes.

The methods can further comprise metalating the carbon electrode with metal from the metal electrode, thereby forming metalated carbon. Preferably, the carbon electrode is maintained in a metalated state throughout operation of the energy storage device. Further still, the method can comprise extracting metal ions from the metal electrode through the metalated carbon of the carbon electrode. Alternatively, or in addition, the method can comprise intercalating metal ions in the carbon electrode, depositing metal ions on the carbon electrode, or both.

In a particular embodiment, the cathode comprises sulfur and/or sulfur compounds and the metal electrode comprises lithium. In such embodiments, the metalated carbon can comprise $LiC_6$ and/or the sulfur compound can comprise $Li_xS_y$, wherein x is from 0 to 4, and y is from 1 to 8. Alternatively, the cathode can comprise a lithium intercalation compound. Examples of lithium intercalation compounds can include, but are not limited to, $Li_{4-x}M_xTi_5O_{12}$ (M=Mg, Al, Ba, Sr, or Ta; 0≤x≤1), $MnO_2$, $V_2O_5$, $V_6O_{13}$, $LiV_3O_8$, $LiM^{C1}_xM^{C2}_{1-x}PO_4$ ($M^{C1}$ or $M^{C2}$=Fe, Mn, Ni, Co, Cr, or Ti; 0≤x≤1), $Li_3V_{2-x}M_x(PO_4)_3$ (M=Cr, Co, Fe, Mg, Y, Ti, Nb, or Ce; 0≤x≤1), $LiVPO_4F$, $LiM^{C1}_xM^{C2}_{1-x}O_2$ (($M^{C1}$ or $M^{C2}$=Fe, Mn, Ni, Co, Cr, Ti, Mg, Al; 0≤x≤1), $LiM^{C1}_xM^{C2}_yM^{C3}_{1-x-y}O_2$ (($M^{C1}$, $M^{C2}$, or $M^{C3}$=Fe, Mn, Ni, Co, Cr, Ti, Mg, or Al; 0≤x≤1; 0≤y≤1), $LiMn_{2-y}X_yO_4$ (X=Cr, Al, or Fe, 0≤y≤1), $LiNi_{0.5-y}X_yMn_{1.5}O_4$ (X=Fe, Cr, Zn, Al, Mg, Ga, V, or Cu; 0≤y≤0.5), $xLi_2MnO_3 \cdot (1-x)LiM^{C1}_yM^{C2}_zM^{C3}_{1-y-z}O_2$ ($M^{C1}$, $M^{C2}$, or $M^{C3}$=Mn, Ni, Co, Cr, Fe, or mixture of; x=0.3-0.5; y≤0.5; z≤0.5), $Li_2MSiO_4$ (M=Mn, Fe, or Co), $Li_2MSO_4$ (M=Mn, Fe, or Co), $LiMSO_4F$ (Fe, Mn, or Co), $Li_{2-x}(Fe_{1-y}Mn_y)P_2O_7$ (0≤y≤1), $Cr_3O_8$, $Cr_2O_5$, and combinations thereof.

The purpose of the foregoing summary is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The summary is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

According to one embodiment, a lithium sulfur battery employs a cathode comprising sulfur and/or sulfur compounds and a hybrid anode comprising a graphite electrode and a lithium metal electrode connected with each other. The battery is configured such that the graphite is in the lithiated state during operation and functions as a dynamic "pump" that supplies Li$^+$ ions while minimizing direct contact between soluble polysulfides and Li metal. Therefore, the continuous corrosion and contamination of Li anode during repeated cycling can be largely mitigated. As a result, excellent electrochemical performances have been observed. After 400 cycles, the as-designed Li—S cell retains a reversible capacity of greater than 800 mAh g$^{-1}$ corresponding to only 11% fade along with a high Coulombic efficiency of above 99%. A similar hybrid anode can be applied in many other energy storage systems that traditionally use metal anodes.

Figure 1A:
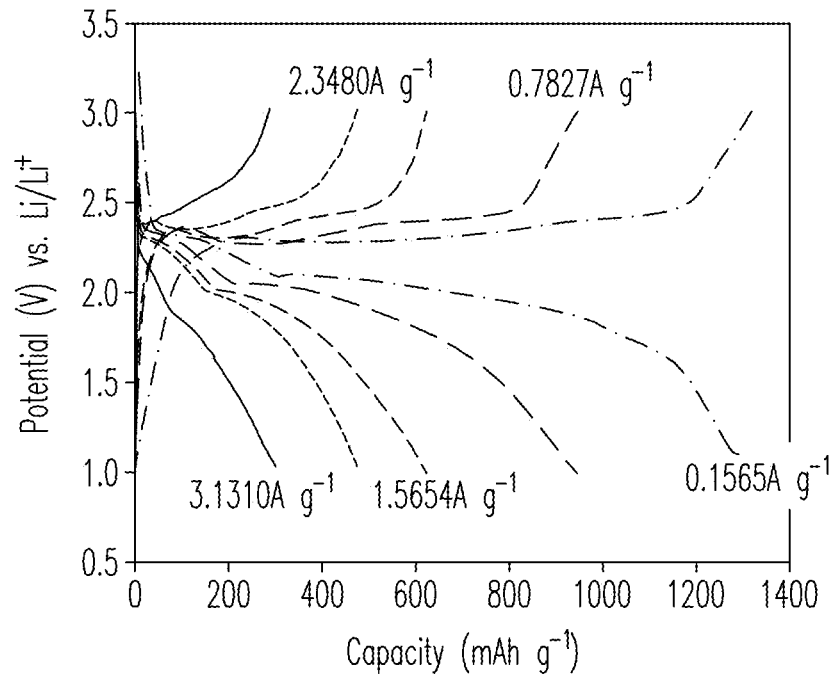
FIGS. 1A-1D are discharge-charge profiles, cycle stability and Coulombic efficiency plots for traditional Li—S cells at various current rates.
Figure 1B:
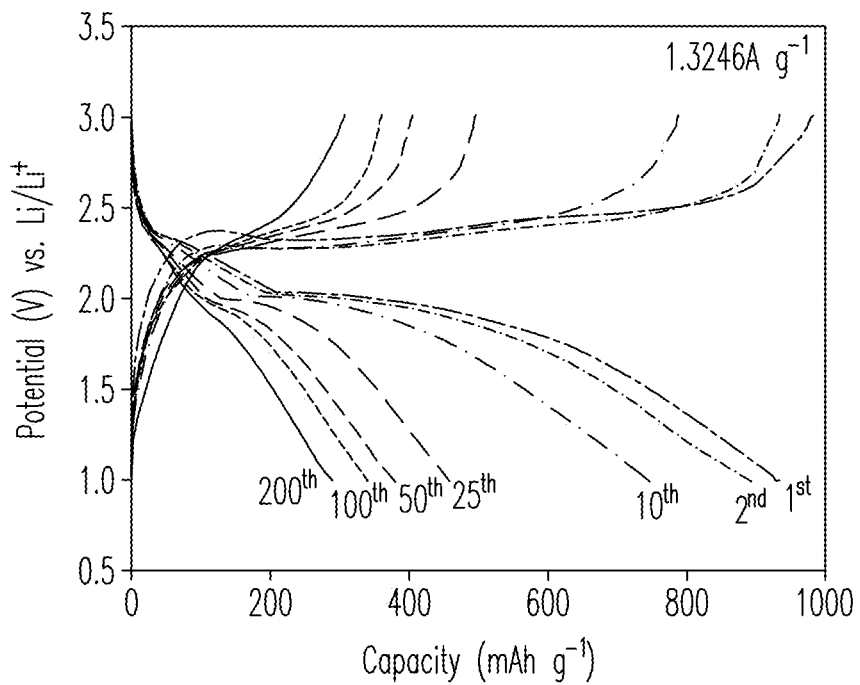
Figure 1C:
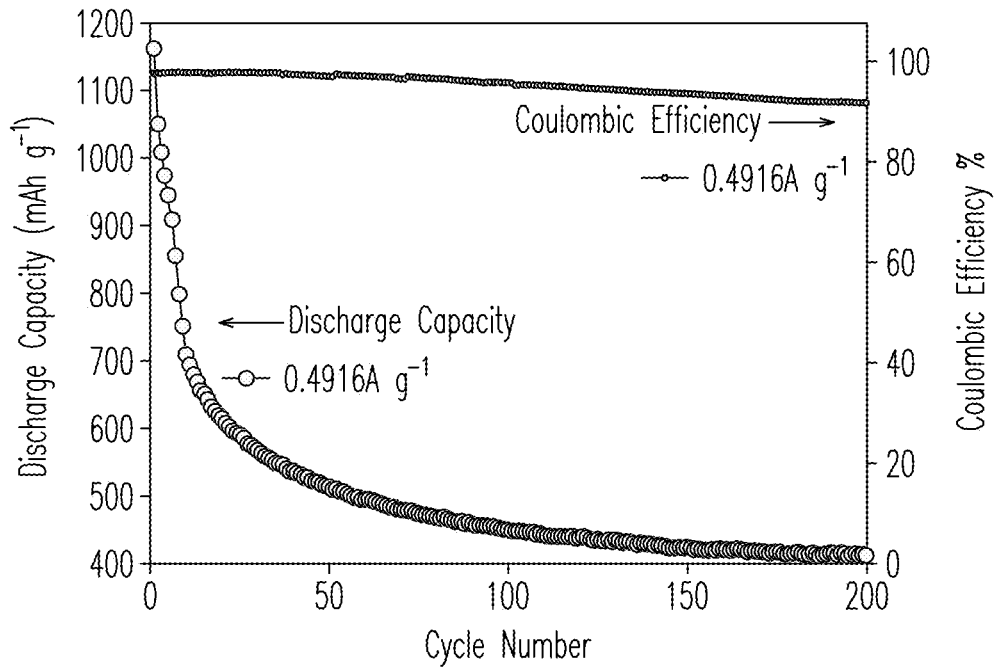
Figure 1D:
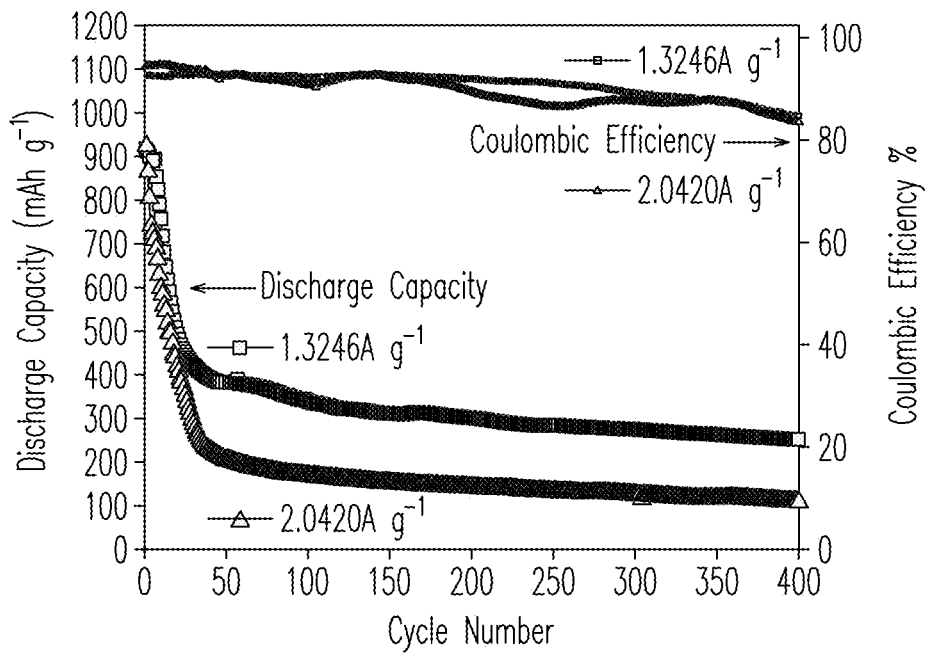

The continuous loss of active material (i.e., sulfur on a Li anode) was identified as one of the reasons for the poor cycling stability of traditional Li—S systems. The electrochemical characteristics of traditional Li—S cells containing sulfur-impregnated mesoporous carbon cathodes are plotted in FIGS. 1A-1D. Morphologies of the Li metal after cycling of these traditional cells are provided in FIG. 2. Typical voltage profiles of sulfur are observed in FIG. 1A (i.e. 2.3 V for transition from S to Li$_2$S$_4$ and 2.0 V for the further reduction to Li$_2$S$_2$/Li$_2$S). When the current density was increased from 0.156 A g$^{-1}$ to 3.131 A g$^{-1}$, the discharge capacity decreased from 1200 mAh g$^{-1}$ to 300 mAh g$^{-1}$ (see FIG. 1B). This cycling performance is expected from traditional mesoporous carbons, which show after about 20 cycles, that capacity retention decreases by approximately 50% and decays very rapidly thereafter when cycled at a low current rate (FIG. 1C). Capacity fade becomes even worse when the cell is cycled at higher current rates (FIGS. 1B and D). Correspondingly, the Columbic efficiency continues to decline during cycling.

Figure 2A:
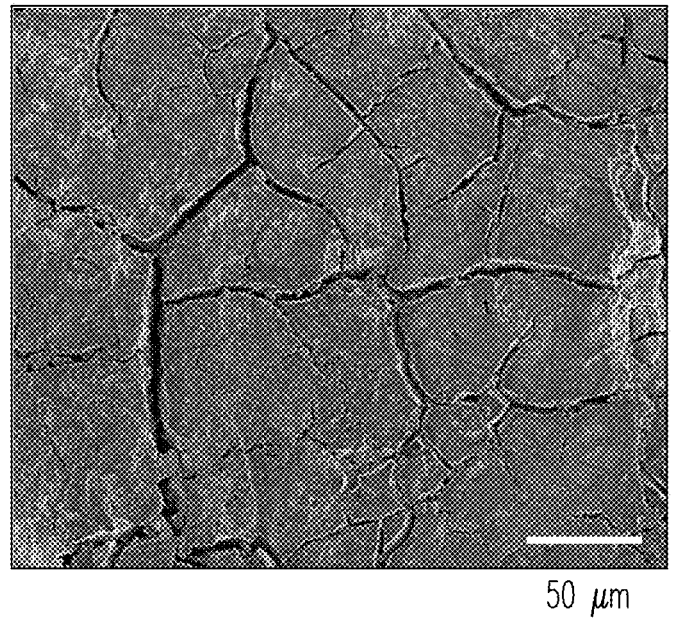
FIGS. 2A-2C include SEM micrographs of lithium foil anodes after cycling in traditional Li—S cells.
Figure 2B:
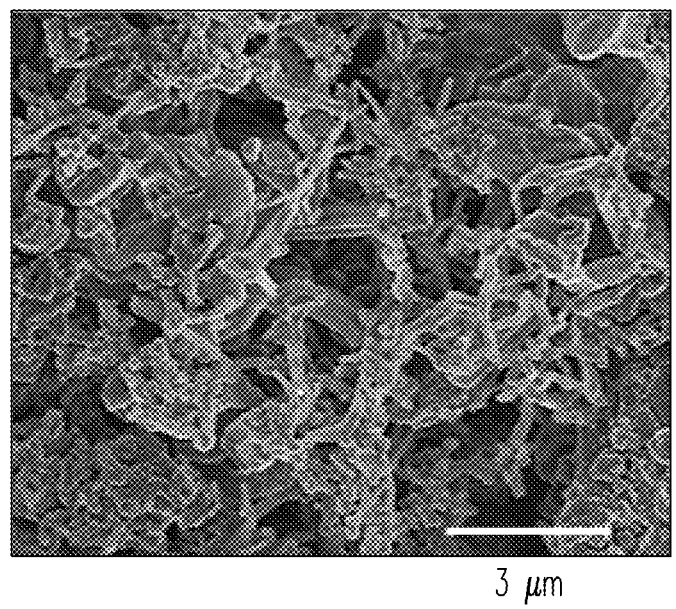
Figure 2C:
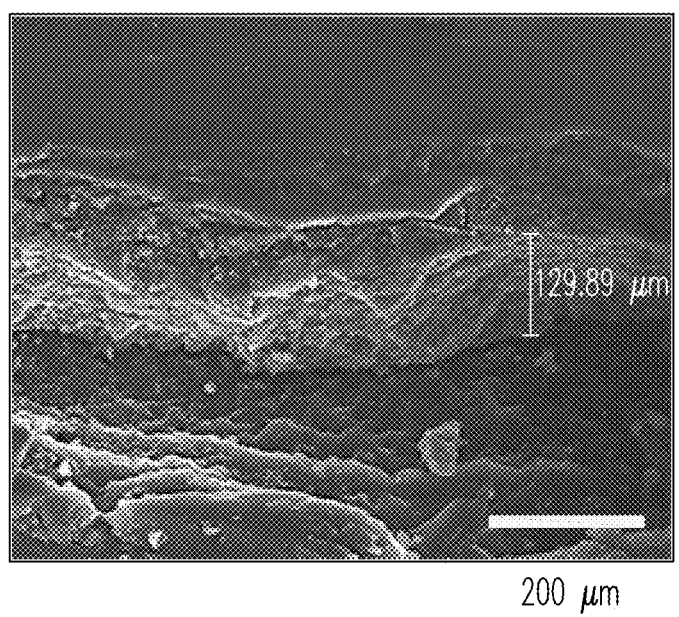

The Li anode, after extensive cycling in this traditional cell, was investigated using SEM as shown in FIG. 2. FIG. 2A shows the top view of the Li anode after cycling. The surface is covered with a thick passivation layer and is characterized by large cracks caused by electrolyte depletion. At higher magnification, the micrograph in FIG. 2B reveals that the Li foil became highly porous, consisting of tubular and irregular particles. The cross-sectional SEM micrograph in FIG. 2C shows that the passivation layer is more than 100 μm thick. More importantly, at higher magnification, cross-sectional SEM and sulfur elemental mapping indicate an extensive (>100 μm thick) reaction zone where the Li metal is penetrated by sulfur. Energy dispersive spectroscopy (EDS) and X-ray fluorescence spectroscopy (XPS) suggest that the chemical composition in this surface film is a complicated combination of sulfides, sulfates, fluorides, and carbonates. However, one can conclude that, in addition to the traditional solid electrolyte interface (SEI) film that is usually formed on Li anode surfaces, a large contributor to this passivation layer is from reactions between Li and dissolved polysulfides, which ultimately form a series of complicated sulfur-containing compounds. The continuous formation of porous Li metal during cycling consumes active sulfur in the electrolyte and increases cell impedance. While mesoporous carbon in the cathode can delay the release of soluble polysulfides, the confinement effect from cathode structures are only effective for a limited time. Further cycling leads to sulfur dissolution of the cathode and more importantly, Li+ metal deposition on the porous Li anode, which then increases the resistance of the entire cell. This results in rapid capacity decay (usually observed after 50 cycles) when only cathode modulation is adopted in this system.

Figure 3A:
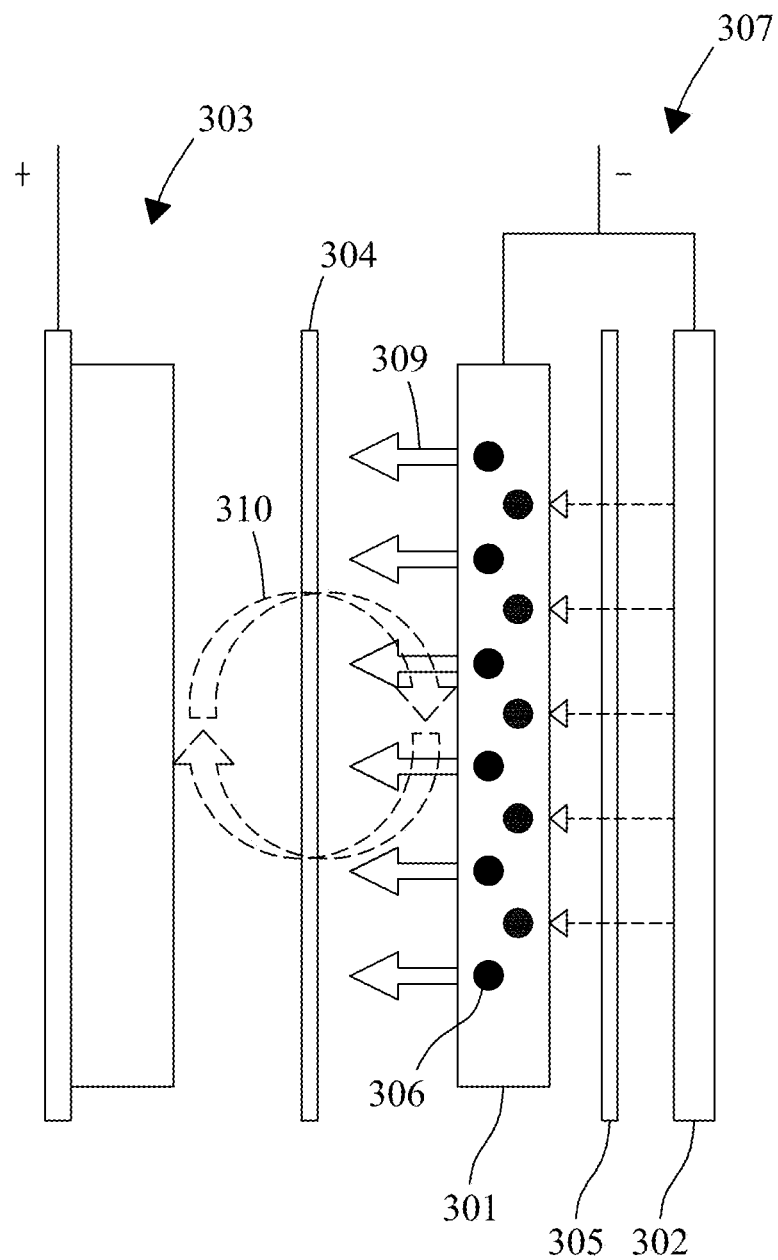
FIGS. 3A and 3B depict different configurations of hybrid anodes in energy storage devices according to embodiments of the present invention.
Figure 3B:
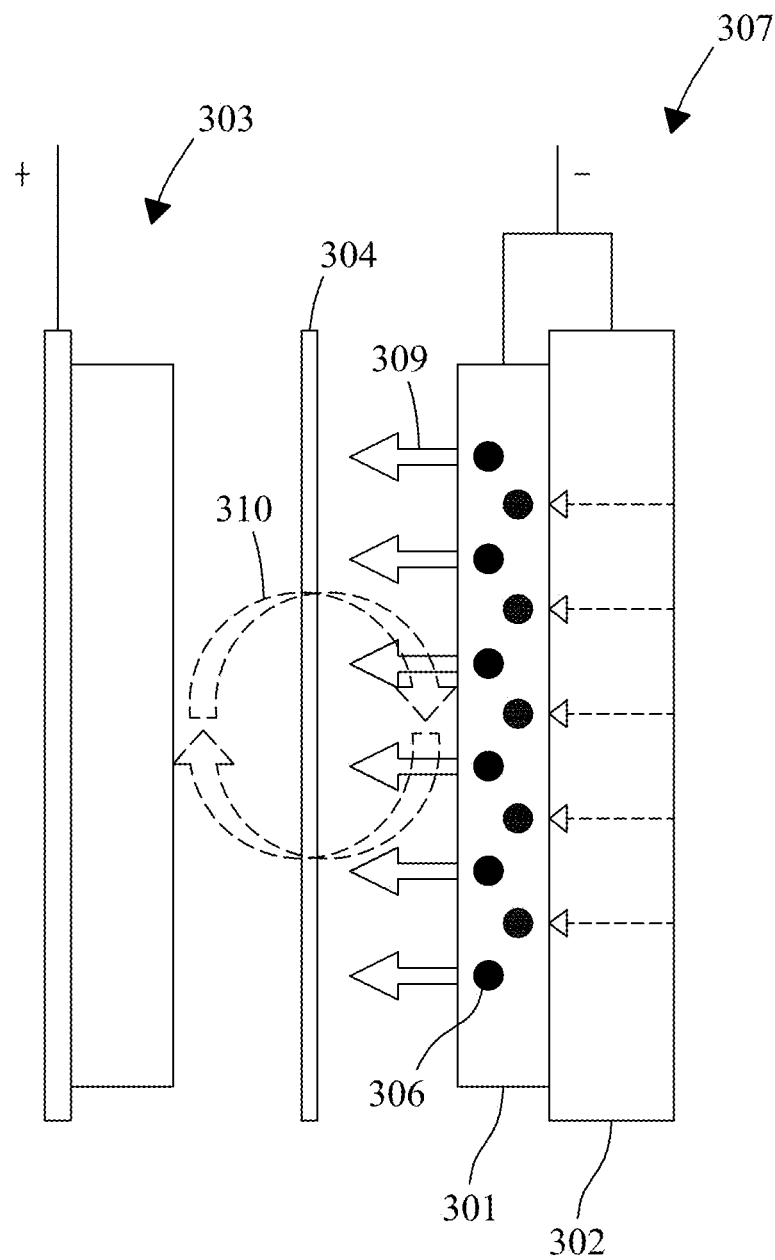

Embodiments of the present invention can address, at least in part, these problems. Referring to the embodiment in FIG. 3A, a carbon electrode 301 is directly connected with a metal electrode 302 and used together as a hybrid anode 307. An anode separator 305 can be placed between the carbon and metal electrodes. Alternatively, the separator can be absent (see FIG. 3B). The carbon electrode comprises metal ions 306 transferred from the metal electrode and intercalated and/or adsorbed at the carbon electrode. In some instances, a region around the graphite electrode can develop wherein byproducts can accumulate, deposit and/or contaminate. During discharge, metal ions will move 309 toward the cathode 303 through a separator 304. In the case of Li—S energy storage devices, circular arrows 310 depict the shuttling of dissolved polysulfides between the anode and cathode. As shown in FIG. 3B, the carbon electrode 301 and the metal electrode 302 can be in direct contact (with or without an anode separator). Once immersed in electrolyte, the carbon will be immediately discharged and will be maintained in the metalated state because the hybrid anode is in one sense a shorted metal/carbon cell.

Figure 4A:
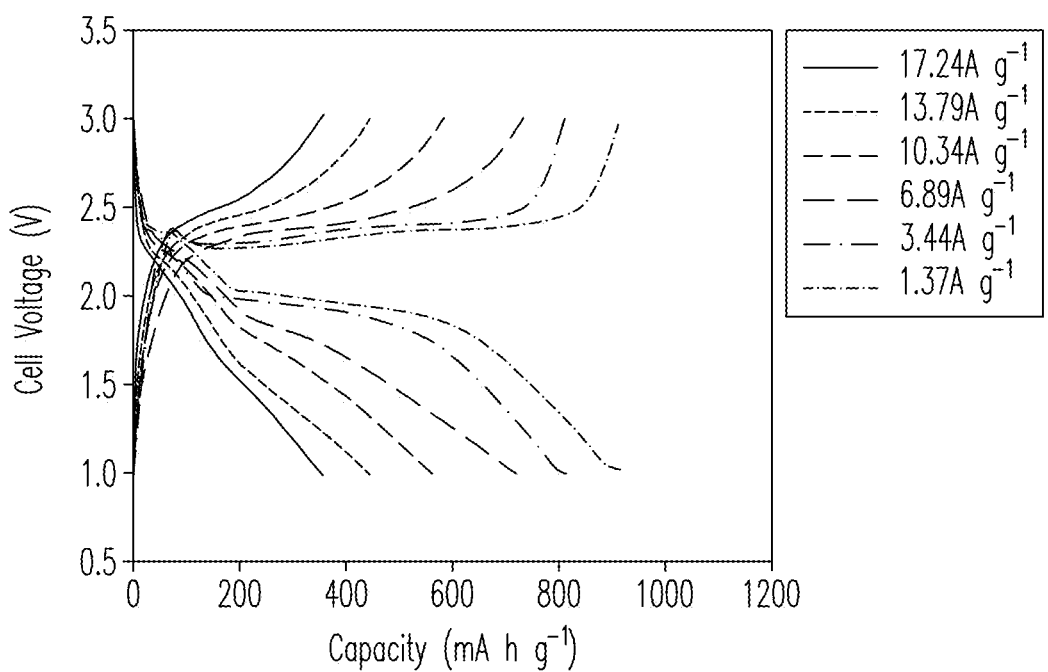
FIGS. 4A-4D are discharge-charge profiles, cycle stability and Coulombic efficiency plots at various current rates for Li—S battery having hybrid anodes according to embodiments of the present invention.
Figure 4B:
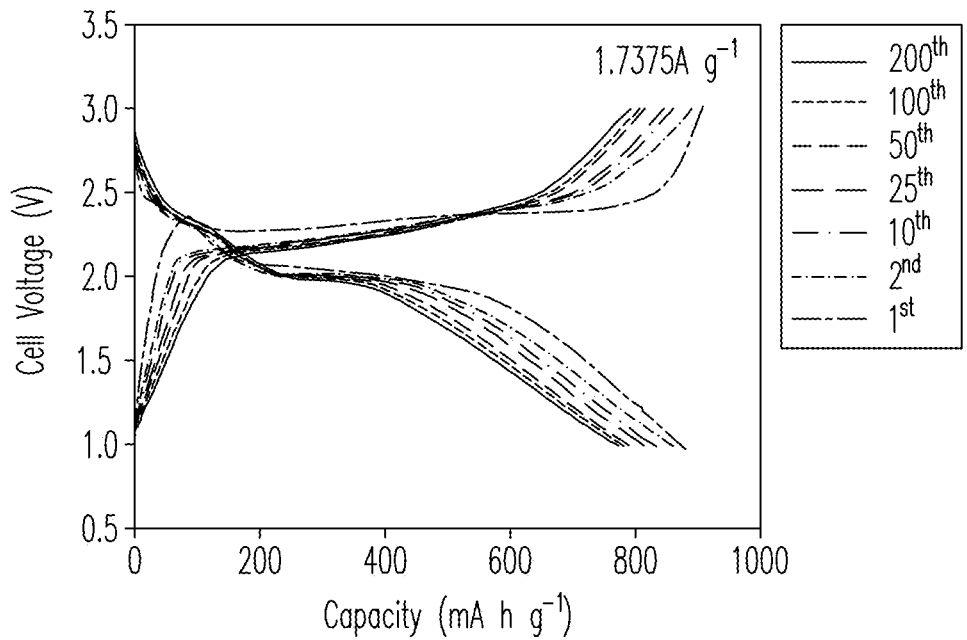
Figure 4C:
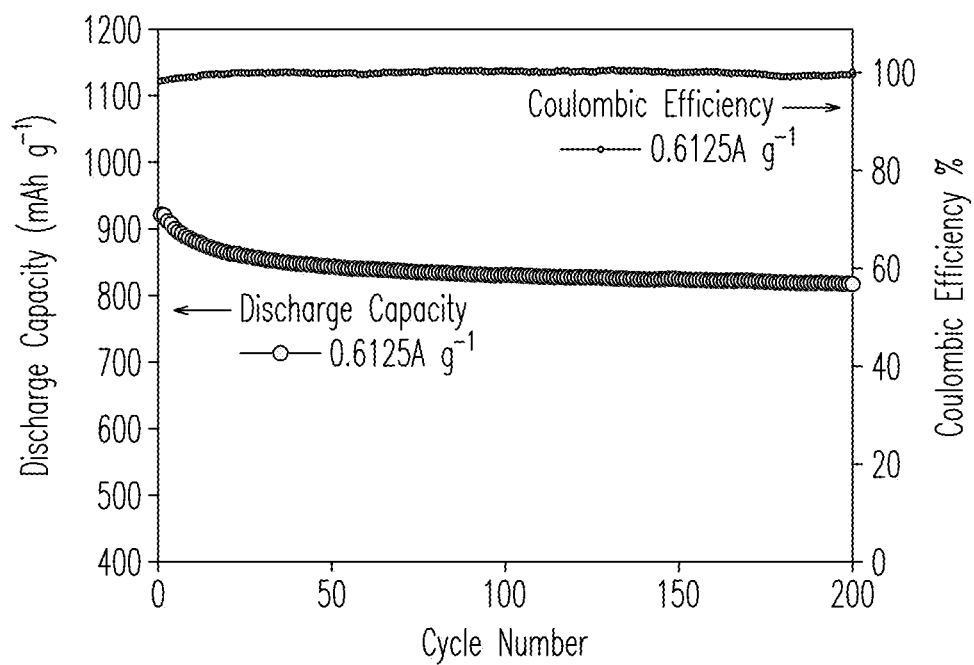
Figure 4D:
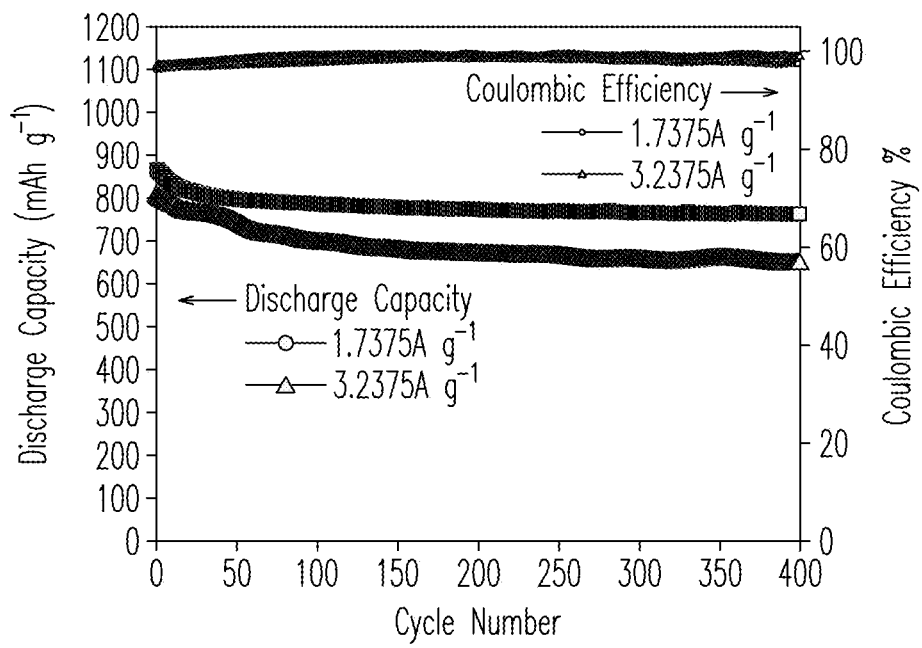

FIG. 4A shows the voltage profiles at different current densities of a Li—S cell utilizing a hybrid anode as described herein. Briefly, the cell includes a cathode comprising sulfur and/or sulfur compounds and a hybrid anode. The hybrid anode comprises a graphite electrode and a lithium metal electrode. The cell delivered a reversible capacity of greater than 900 mAh g$^{-1}$ at 1.37 A g$^{-1}$ (~0.8 C). Even at a high rate of 13.79 A g$^{-1}$ (~8C), more than 450 mA g$^{-1}$ capacity was demonstrated. In addition, far more stable discharge/charge profiles of sulfur are observed in these cells (see FIG. 4B). FIGS. 4C and 4D compare the long term cycling performance at different current densities along with Coulombic efficiencies of Li—S cells that contain hybrid anodes according to embodiments of the present invention. A significantly improved cycling stability was observed at all rates. For example, at 0.6125 A g$^{-1}$, although initial capacity loss is still observed, the capacity becomes extremely stable after 50 cycles, maintaining approximately 850 mAh g$^{-1}$ for more than 200 cycles (FIG. 4C). The Columbic efficiency is also nearly 100% over the entire cycling test due to the absence of overcharging in the cells. Similar performance is further observed at higher discharge rates (see FIG. 4D). which indicates that the shuttle mechanism has been significantly reduced or eliminated.

In some embodiments, the carbon electrode is metalated. For example, in Li—S batteries having a hybrid anode as described herein, the graphite electrode can comprise lithiated carbon. The lithiated carbon can be a physical barrier that interferes with the traditional concentration gradient of soluble species in the electrolyte. Physical absorption of polysulfides on the graphite surface reduces further transport of soluble intermediates onto the lithium metal anode. Control cells in which Li foil and graphite electrodes were not connected in parallel, yet were in physical contact, confirm that embodiments of the present invention can minimize the reaction of polysulfides with the Li metal anode. When compared with traditional Li—S cells (as shown in FIG. 1C), cycling performance is only slightly improved indicating that the graphite forms a partial physical/chemical barrier, even when not connected to the lithium metal anode, that can slow down adverse polysulfide reactions with Li metal, although not to the extent seen in the hybrid anodes described herein.

In some embodiments, a metalated carbon electrode can function as a pump to supply metal ions during discharge. For example, the lithiated graphite in Li—S batteries having hybrid anodes according to embodiments of the present invention can supply Li$^+$ during discharge. There is a difference of 0.02 V between the Li$^+$ extraction voltage for LiC$_6$ and Li metal. Thus, theoretically Li$^+$ should first move from Li metal to the graphite during discharge in the Li—S cells. However, at relatively higher rates than those used in conventional lithium batteries, Li$^+$ ions will be released from both LiC$_6$ in the graphite electrode and from Li metal because the surface concentration of Li$^+$ ions around either LiC$_6$ or Li surfaces are both very low (close to zero) at high current densities. Under this condition, the 0.02 V voltage difference may be negligible and Li$^+$ ions may be largely provided by the lithiated graphite considering their preferred position in the cell configuration. Because the carbon electrode is shorted with the metal electrode, once Li$^+$ is depleted from the graphite, it can be quickly replenished from the Li metal. In other words, lithiated graphite can function as a dynamic "pump" that continuously drains Li$^+$ ions from Li metal reservoir and ejects Li$^+$ ions on demand.

Figure 5:
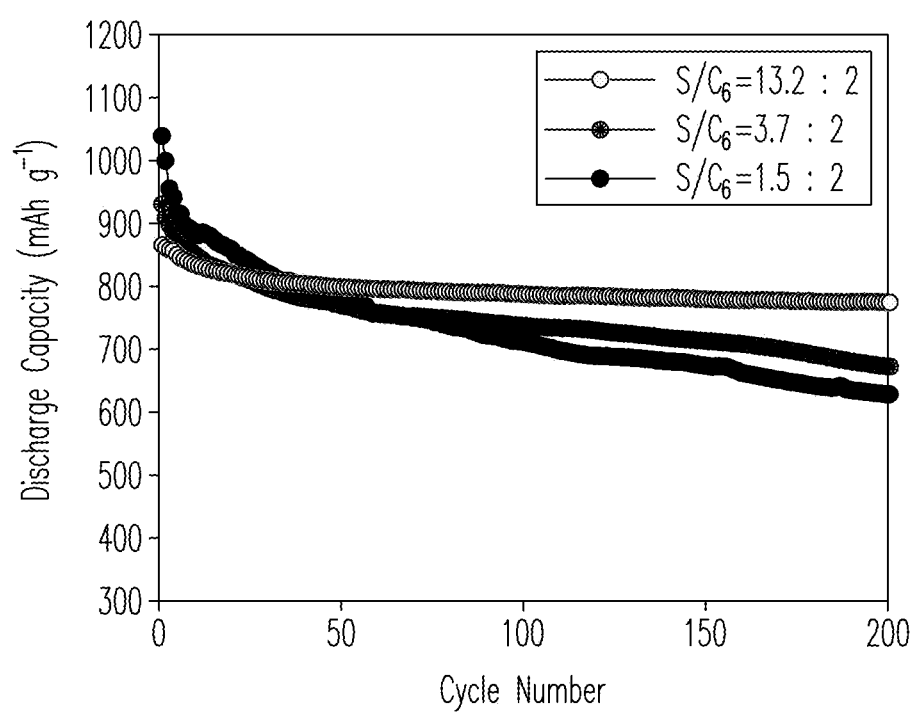
FIG. 5 is a plot of discharge capacity as a function of cycle number for a Li—S battery having a hybrid anode according to embodiments of the present invention with varying amounts of carbon in the structure.

Referring to FIG. 5, the electrochemical behavior of a series of hybrid Li—S cells with different graphite loadings were fabricated and compared at a 1C rate. Assuming the stoichiometric reaction S+2Li=Li$_2$S, the molar ratio of S/graphite (C$_6$) should be ½ because in graphite, 1 mole of Li$^+$ ions has to be accommodated by 6 moles of carbon atoms (LiC$_6$). When S is provided in excess, then the discharge capacity can be determined by LiC$_6$ on the anode side because Li$^+$ ions are mainly provided from LiC$_6$ as described previously. Three different S:C$_6$ ratios (all greater than ½) were compared and FIG. 5 shows that the initial discharge capacity is proportional to the moles of graphite, while the total Li$^+$ ions available from Li metal was identical in all cases. These findings provide further evidence that, during discharge, Li$^+$ ions are provided from lithiated graphite, while Li metal can be considered a Li$^+$ reservoir that refills graphite as Li$^+$ ions are depleted. The major electrochemical reaction occurs between the cathode, which comprises sulfur and/or sulfur compounds, and the carbon electrode, which comprises LiC$_6$, in the hybrid anode. In comparison, a simple LiC$_6$/S cell using the same sulfur/sulfur compound-containing cathode combined with a pre-lithated graphite anode shows poor electrochemical performance.

Although higher amounts of graphite can result in a larger initial capacity using the hybrid anodes described herein, capacity fading is also more pronounced with increasing LiC$_6$ content. This can be attributed to the increased thickness and available surface area of graphite incorporated in the hybrid anode. Because an equivalent amount of electrolyte is used in all tests and the graphite faces the separator, the accessibility of electrolyte, and subsequent dissolved polysulfide species, to the Li metal electrode is reduced. Therefore sulfur, and polysulfide, reactions are primarily confined to the graphite preferentially over the Li metal surfaces. For this reason, the total surface area of graphite dictates the amount of "wasted" sulfur, i.e. sulfur consumed in surface reactions and SEI formation, on the anode. This can explain why the cycling behavior of cells with higher carbon-to-sulfur ratios is inferior to those with lower amounts of graphite (FIG. 5). To further confirm that a lower surface area of carbon can benefit the hybrid design, a hard carbon (BET surface area: 75.8 m$^2$ g$^{-1}$) was used to replace graphite (BET surface area: 6.4 m$^2$ g$^{-1}$) in the hybrid structure. As expected, the performance from cells using the hard carbon/Li anode is worse than those using the original graphite (LiC$_6$)/Li hybrid design. Nevertheless, when compared to traditional Li—S batteries that use Li-metal anodes (FIG. 1), there is still a large improvement in performance with the cells containing a hard carbon/Li hybrid anode, further validating the unique benefits of this anode design. In preferred embodiments, the carbon materials have an electrochemical reduction potential very close to Li/Li$^+$ (to facilitate Li$^+$ extraction) combined with a low surface area to reduce undesired side reactions with sulfur species.

Figure 6A:
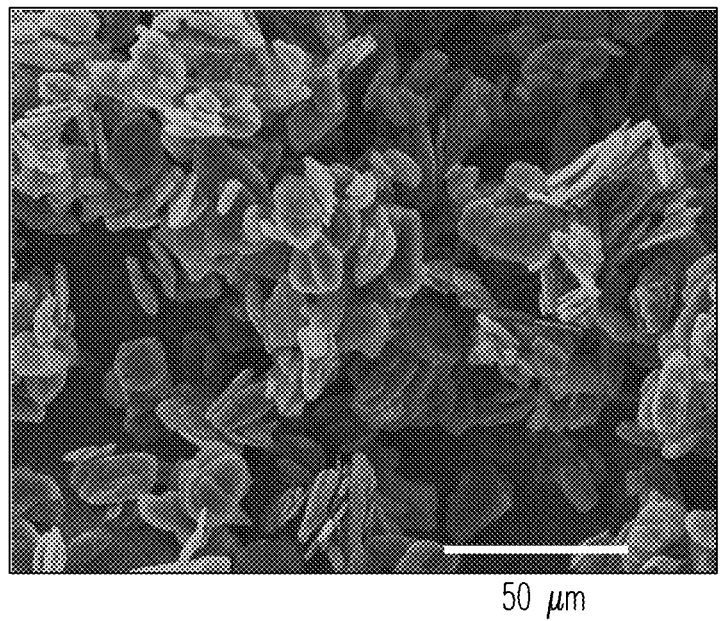
FIGS. 6A-6D include SEM micrographs of hybrid anodes before and after operation of Li—S batteries according to embodiments of the present invention.
Figure 6B:
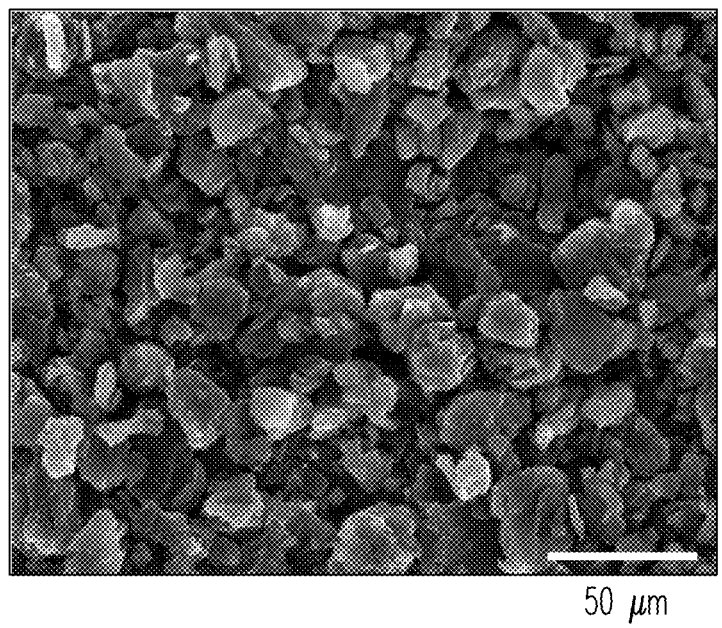
Figure 6C:
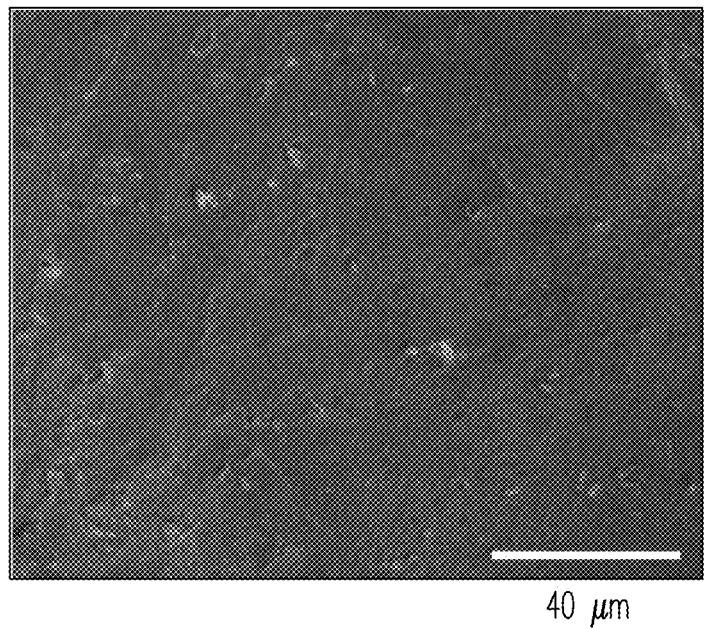
Figure 6D:
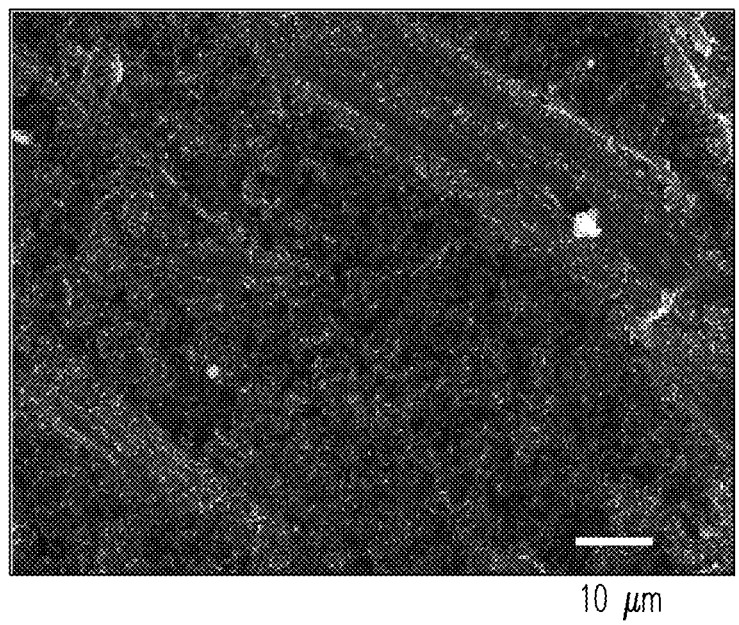

In some embodiments, during charging, Li$^+$ ions diffuse back to the metal electrode where they are redeposited. One issue is to determine if the Li ions will preferentially deposit on the Li-foil or the lithiated graphite portions of the hybrid anode. SEM micrographs in FIG. 6 show the "as prepared" graphite surface of the hybrid anode (FIG. 6A) and the same surface after 1000 charge/discharge cycles at a 1C rate (FIG. 6B) in a Li—S cell. Little morphological change has occurred after extensive cycling yet the surface is rich in sulfur as determined by elemental mapping. After long-term cycling, the morphology of the corresponding Li-foil surface (facing the graphite) is shown in FIGS. 6C and D. There is no evidence of dendritic lithium growth or extensive surface reactions which is dramatically different than the Li metal anodes tested in conventional Li—S cells (FIGS. 2A and 2B). In addition, minimal amounts of sulfur were observed on the Li metal surface using EDS mapping. These findings suggest that the highly reactive electrolyte/solid domains that cause active mass loss are largely transferred from the Li metal to lithiated graphite. Graphite is an intercalation compound that can accommodate up to 10% volume expansion without mechanical degradation and exposure of new reactive surfaces thus reducing parasitic losses in the cell. Therefore, in some embodiments, cathodes comprising an intercalation compound can be preferred.

The hybrid anodes described herein can be also utilized in lithium-ion batteries having cathodes comprising lithium intercalation compounds. In one instance, a series of test cells using commercially-available materials were prepared. The cathodes in all cells were prepared using a pyrolytic carbon-coated, nanosized, LiFePO$_4$ powder (LFP). The LFP cathodes were then paired with one of three test anodes; (1) Li foil, (2) graphite, or (3) Li foil+graphite configured as a hybrid anode according to embodiments described herein.

The cathodes were prepared by coating well-dispersed slurries containing 80 wt % LFP powder, 10 wt % Super-P® conductive carbon black, and 10 wt % polyvinylidene difluoride (PVDF) binder dissolved in N-methyl-2-pyrrolidinone (NMP) onto a thin aluminum-foil current collector. The LFP cathode was dried at 70° C. under vacuum for 12 h. A hydraulic press was used to compact the LFP-Al electrode to minimize electrode contact resistance.

To prepare the hybrid Li-carbon anodes, carbon was pasted or coated onto a thin porous metallic mesh (current collector) and then electrically connected to a Li metal foil with a commercial separator sandwiched between the graphite and Li foil. The carbon material was high power CPreme® graphite material G5 from ConocoPhillips coating/graphitization technology. The separator was not necessary and the hybrid anode could be constructed by simply laminating Li foil to the graphite. Good bonding between the metallic mesh, graphite and conductive carbon minimizes de-lamination, pinholes, and diminished internal cell resistance.

The porous metal-carbon mesh electrode was prepared by coating well-dispersed slurries containing 80 wt % CPreme® G5 graphite powder, 10 wt % Super-P® conducting carbon black, and 10 wt % PVDF dissolved in NMP onto thin porous copper mesh. The carbon electrodes were dried at 70° C. under vacuum for 12 h, and then hot pressed to form the final carbon laminated electrode. Alternatively, the porous carbon-metallic mesh electrode can be prepared by hot pressing of free-standing carbon thin films onto the thin cooper mesh. The carbon-PTFE composite powder was first obtained by drying well-dispersed slurries containing 80 wt % CPreme® G5 graphite powder, 10 wt % Super-P Li conducting carbon black, and 10 wt % PTFE emulsion diluted in distilled water. The powder was then rolled to form carbon-PTFE free-standing thin films with the desired thickness by a Cavallin flat roller. Finally, the film was hot pressed onto the thin metallic mesh using a Carver hot press.

All of the coin cells were assembled in an argon-filled glove box with moisture and oxygen contents of less than 1 ppm. Lithium metal disks (Φ15 size and 0.5 mm thickness) were used as the anode for traditional Li-LFP cells and as the metal electrode of the hybrid anode for hybrid cells. The battery-grade electrolyte (Purolyte®) contained 1M LiPF$_6$ dissolved in a mixture of ethyl carbonate/dimethyl carbonate/diethyl carbonate EC/DMC/DEC=1:1:1 (volume ratio). A microporous membrane (Celgard 3501®, 25 μm thickness) was used as the separator. To assemble the hybrid cells, the LFP cathode, a first separator, carbon-metallic mesh electrode, thin metallic ring, a second separator, and lithium foil were punched into Φ15, Φ19, Φ15, Φ15, Φ13 and Φ15 sizes, respectively, and electrolyte was added into each cell layer-by-layer, using a pipette. In one design, the metallic mesh was calendared and punched into metallic rings ~25 μm in thickness to form the electrical contact between the two components of the hybrid anode. Alternatively, the metallic ring can be replaced by small pieces of metallic mesh to make edge point contact between the lithium foil and carbon-metallic mesh electrode. The layers of the hybrid anode can be separated by the second separator, or sandwiched together directly. All cell components were then carefully aligned, integrated and sealed using a compact hydraulic crimping machine to form the final test device.

Electrochemical tests were performed using 2325 coin cells in an ambient environment. The galvanostatic discharge-charge test was conducted using a BT-2043 Arbin® Battery Testing System. The hybrid cells and half cells were cycled at different current rates in the voltage interval of 2.5-4.2V. Due to the initial irreversible loss observed for the control cells, the G5-LFP control cells with graphite anodes were tested between 2-4.2V. All capacity values were calculated on the basis of LFP mass. After cycling, several of the coin cells were disassembled in the charged or discharged state for further analysis.

Figure 7:
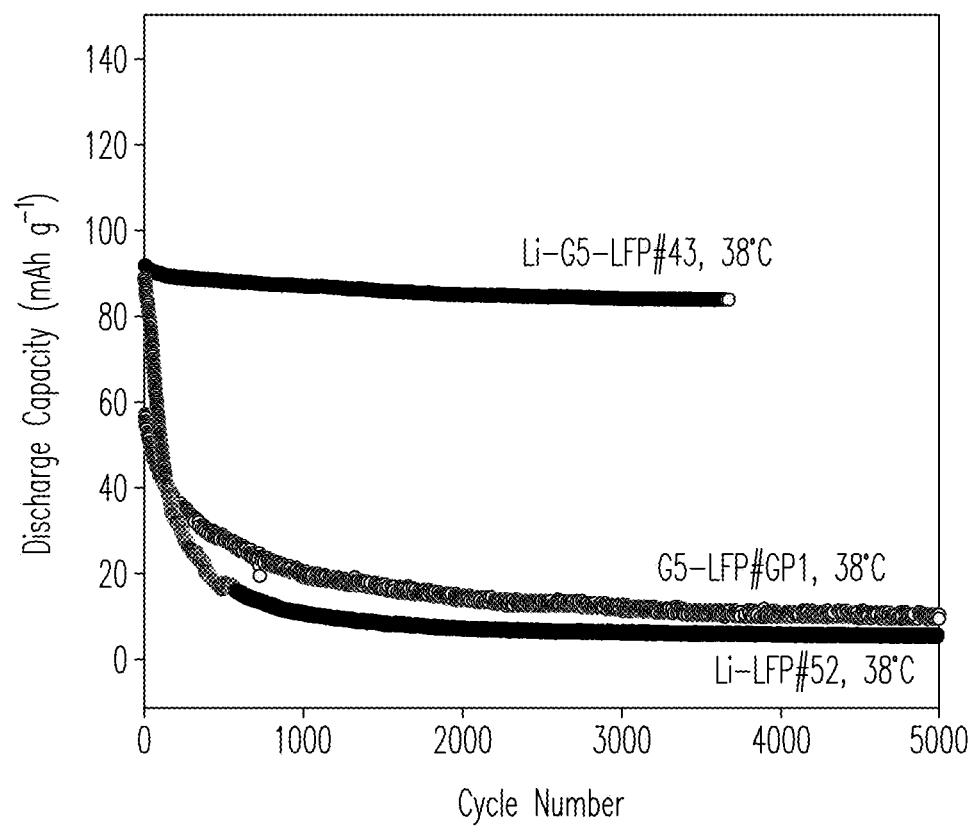
FIG. 7 is a plot of discharge capacity as a function of cycle number for Li-ion cells containing standard graphite anodes versus the hybrid anode according to embodiments of the present invention.

FIG. 7 shows the long-term cycling performance of the three tests cells at high charge/discharge rate (i.e., 38C). The hybrid anode described herein results in greatly improved capacity retention, showing little fade after 3500 cycles. The specific capacity of cells containing graphite, or Li-foil, anodes faded to near zero within 500 cycles. This shows that the hybrid anode design is useful in extending the performance and cycle life of cells/batteries using Li-ion chemistries.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A cell consisting of an electrode arrangement, wherein the electrode arrangement consists of a cathode separated from a hybrid anode by a first separator, the hybrid anode consisting of a single carbon electrode connected to a metal electrode comprising Li, an anode separator between the single carbon electrode and the metal electrode, and a single current collector, wherein the single current collector contacts the single carbon electrode, thereby resulting in an equipotential between the carbon and metal electrodes, wherein the cathode comprises a lithium intercalation material, and the single carbon electrode comprises lithium ions intercalated therein, deposited thereon, or both.

2. The cell of claim 1, wherein the single carbon electrode is located between the first separator and the anode separator.

3. The cell of claim 1, wherein the carbon electrode comprises a carbonaceous material selected from the group consisting of graphite, hard carbon, carbon black, carbon fibers, graphene, and combinations thereof.

4. The cell of claim 1 wherein the lithium intercalation material is selected from the group consisting of $Li_{4-x}M_xTi_5O_{12}$ (M=Mg, Al, Ba, Sr, or Ta; 0≤x≤1), $MnO_2$, $V_2O_5$, $V_6O_{13}$, $LiV_3O_8$, $LiM^{C1}_xM^{C2}_{1-x}PO_4$ ($M^{C1}$ or $M^{C2}$ Fe, Mn, Ni, Co, Cr, or Ti; 0≤x≤1), $Li_3V_{2-x}M_x(PO_4)_3$ (M=Cr, Co, Fe, Mg, Y, Ti, Nb, or Ce; 0≤x≤1), $LiVPO_4F$, $LiM^{C1}_xM^{C2}_{1-x}O_2$ (($M^{C1}$ or $M^{C2}$ Fe, Mn, Ni, Co, Cr, Ti, Mg, Al; 0≤x≤1), $LiM^{C1}_xM^{C2}_yM^{C3}_{1-x-y}O_2$ (($M^{C1}$, $M^{C2}$, or $M^{C3}$=Fe, Mn, Ni, Co, Cr, Ti, Mg, or Al; 0≤x≤1; 0≤y≤1), $LiMn_{2-y}X_yO_4$ (X=Cr, Al, or Fe, 0≤y≤1), $LiNi_{0.5-y}X_yMn_{1.5}O_4$ (X=Fe, Cr, Zn, Al, Mg, Ga, V, or Cu; 0≤y≤0.5), $xLi_2MnO_3$.(1-x)$LiM^{C1}_yM^{C2}_zM^{C3}_{1-y-z}O_2$ ($M^{C1}$, $M^{C2}$, or $M^{C3}$ Mn, Ni, Co, Cr, Fe, or mixture of; x=0.3-0.5; y≤0.5; z≤0.5), $Li_2MSiO_4$ (M=Mn, Fe, or Co), $Li_2MSO_4$ (M=Mn, Fe, or Co), $LiMSO_4F$ (Fe, Mn, or Co), $Li_{2-x}(Fe_{1-y}Mn_y)P_2O_7$ (0≤y≤1), $Cr_3O_8$, $Cr_2O_5$, and combinations thereof.

5. The cell of claim 1, wherein the carbon electrode further comprises metalated carbon during charging and discharging of the device.

6. The cell of claim 1 further comprising lithiated carbon at the single carbon electrode.

7. The cell of claim 4, wherein the carbon electrode comprises a carbonaceous material selected from the group consisting of graphite, hard carbon, carbon black, carbon fibers, graphene, and combinations thereof.

8. The cell of claim 6, wherein the lithiated carbon comprises $LiC_6$.

9. The cell of claim 1, wherein the carbon electrode comprises graphite and lithium ions intercalated therein, deposited thereon, or both, and the lithium intercalation material is selected from the group consisting of $Li_{4-x}M_xTi_5O_{12}$ (M=Mg, Al, Ba, Sr, or Ta; 0≤x≤1), $LiM^{C1}_xM^{C2}_{1-x}PO_4$ ($M^{C1}$ or $M^{C2}$=Fe, Mn, Ni, Co, Cr, or Ti; 0≤x≤1), $Li_3V_{2-x}M_x(PO_4)_3$ (M=Cr, Co, Fe, Mg, Y, Ti, Nb, or Ce; 0≤x≤1), $LiVPO_4F$, $LiM^{C1}_xM^{C2}_{1-x}O_2$ (($M^{C1}$ or $M^{C2}$=Fe, Mn, Ni, Co, Cr, Ti, Mg, Al; 0≤x≤1), $Li_2MSiO_4$ (M=Mn, Fe, or Co), $Li_2MSO_4$ (M=Mn, Fe, or Co), $LiMSO_4F$ (Fe, Mn, or Co), $Li_{2-x}(Fe_{1-y}Mn_y)P_2O_7$ (0≤y≤1), $Cr_3O_8$, $Cr_2O_5$, and combinations thereof.

10. The cell of claim 9, wherein the lithium intercalation material is $LiFePO_4$ or $LiFeSO_4F$.

11. A lithium-ion energy storage device comprising a cathode separated from a hybrid anode by a first separator, the hybrid anode comprising a carbon electrode connected to a metal electrode comprising Li and an anode separator between the carbon electrode and the metal electrode, and a single current collector, wherein the single current collector contacts the single carbon electrode, thereby resulting in an equipotential between the carbon and metal electrodes, wherein the cathode comprises a lithium intercalation material selected from the group consisting of $Li_{4-x}M_xTi_5O_{12}$ (M=Mg, Al, Ba, Sr, or Ta; $0 \leq x \leq 1$), $LiM^{C1}_xM^{C2}_{1-x}PO_4$ ($M^{C1}$ or $M^{C2}$=Fe, Mn, Ni, Co, Cr, or Ti; $0 \leq x \leq 1$), $Li_3V_{2-x}M_x(PO_4)_3$=Cr, Co, Fe, Mg, Y, Ti, Nb, or Ce; $0 \leq x \leq 1$), $LiVPO_4F$, $LiM^{C1}_xM^{C2}_{1-x}O_2$ (($M^{C1}$ or $M^{C2}$ Fe, Mn, Ni, Co, Cr, Ti, Mg, Al; $0 \leq x \leq 1$), $Li_2MSiO_4$ (M=Mn, Fe, or Co), $Li_2MSO_4$ (M=Mn, Fe, or Co), $LiMSO_4F$ (Fe, Mn, or Co), $Li_{2-x}(Fe_{1-y}Mn_y)P_2O_7$ ($0 \leq y \leq 1$), $Cr_3O_8$, $Cr_2O_5$, and combinations thereof, and the carbon electrode comprises graphite and lithium ions intercalated therein, deposited thereon, or both.

12. The device of claim 11, wherein the lithium intercalation material is $LiFePO_4$ or $LiFeSO_4F$.

* * * * *